Feb. 1, 1944.    L. H. LEFCOURT    2,340,392
METHOD OF MAKING CORRUGATED RUBBER MATS
Filed Feb. 19, 1942

INVENTOR.
LEONARD H. LEFCOURT
BY Irving Seidman
ATTORNEY.

Patented Feb. 1, 1944

2,340,392

UNITED STATES PATENT OFFICE 2,340,392

METHOD OF MAKING CORRUGATED RUBBER MATS

Leonard H. Lefcourt, New York, N. Y.

Application February 19, 1942, Serial No. 431,562

1 Claim. (Cl. 18—61)

This invention relates to the manufacture of rubber mats containing numbers, letters or designs.

More particularly, my invention relates to a method of putting numbers, characters and designs of different colors into rubber mats so that the entire mat has the appearance of a single unit.

An object of my invention is the insertion of numbers, characters and designs into corrugated rubber mats by an economical process so that the corrugations of the rubber mat continue through the numbers, characters or designs inserted in order to produce a unified appearing surface. The numbers, characters or designs usually inserted are of different colored rubber in order to give a pleasing appearance to the surface and make such insertions more visible.

For a fuller understanding of the nature and objects of my invention reference is had to the following detailed description in connection with the accompanying drawing, in which.

Figure 2:
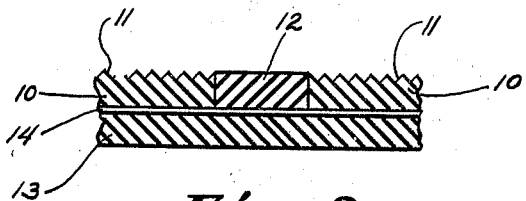
Fig. 2 is an enlarged cross-section taken through line 2—2 of Fig. 1, except that the inserted number is flat before it is vulcanized.
Figure 3:
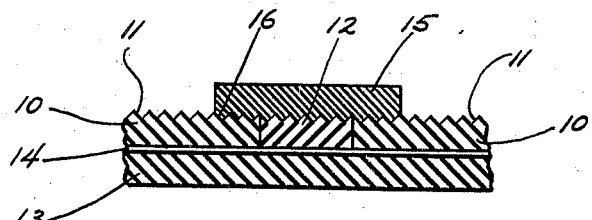
Fig. 3 is an enlarged cross-section of the rubber mat showing the corrugated die in position over the inserted number after vulcanization.
Figure 4:
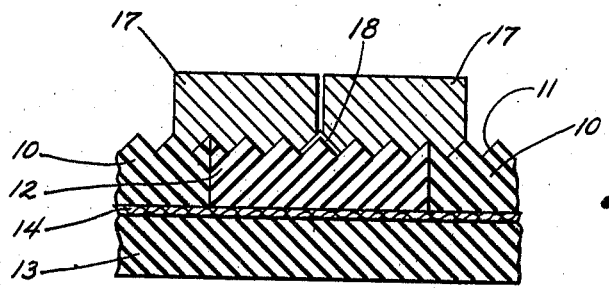
Fig. 4 is an enlarged cross-section showing two corrugated dies over the inserted number with a small plate between such dies.

Referring to the drawing, numeral 10 represents the upper rubber layer or face of a mat showing corrugations 11 running across the face of the entire mat. Upon the face of the mat there are inserted characters 12 approximately one-half the thickness of the mat. Such characters 12 are generally of a different colored rubber and are inlaid into the surface of the mat approximately one-half the thickness of the mat, as shown in Figs. 2, 3 and 4.

The body of the mat consists of a layer 13 of base rubber, upon the surface of which there is a layer 14 of linen or other textile fabric. The upper layer 10 rests upon the fabric layer 14.

Figure 1:
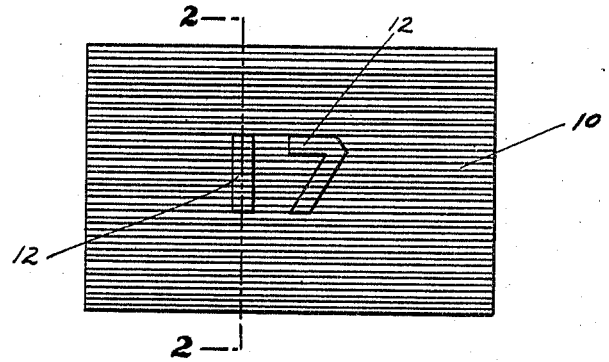
Fig. 1 is a plan view of a corrugated rubber mat having numbers on the face thereof.

In order to insert characters 12 upon a rubber mat such as is shown in the figures of the drawing, for example, the numerals 17 appearing in Fig. 1, I first cut out the numbers 1 and 7 of rubber different in color than upper layer 10, and lay such numbers upon the upper layer of rubber 10. I then run a knife around the outer edges of the numbers one and seven cutting through the upper layer 10 until the linen layer 14 is reached. I then remove the numerals 1 and 7 cut out from the upper rubber layer 10, leaving channels of the shape of the numbers 1 and 7 to be inserted.

The numbers one and seven of a different colored rubber are then cemented into the channels with rubber cement.

A metal die 15 having corrugations 16 on one surface to match the corrugations 11 running across the rubber mat is placed upon the surface of the upper layer of rubber 10 and the inserted numerals 1 and 7 so that the corrugations 16 of the die match the corrugations 11 of the upper surface of the rubber layer 10.

The entire mat, including the die 15, is then placed into a vulcanizing press under application of heat and pressure.

When the mat is taken out of the vulcanizing press and the corrugated die 15 is removed it will be found that the numbers 1 and 7 have been vulcanized into the mat with corrugations 11 running across the inserted numbers matching the corrugations 11 of the upper face of the mat.

If the inserted numbers or characters are large, split corrugated dies 17—17 may be used with a channel member 18 between the dies 17—17 as shown in Fig. 4 so that the rubber will not flow between the dies 17—17 during the vulcanizing process.

It is obvious that instead of numbers and letters, designs may thus be inserted into the face of the mat and vulcanized by my process so that the corrugations run across the numbers, letters or design. It is further obvious that various changes and modifications may be made in my method without departing from the general spirit of the invention, as set forth in the appended claim.

I claim:

A method of making a corrugated rubber mat with designs or characters by first taking a rubber mat consisting of base rubber, a fabric layer and an upper corrugated rubber layer, then placing the characters to be inserted upon the upper rubber layer, tracing a line around such characters, removing the characters from the upper surface and cutting channels into the upper layer to the fabric layer, removing the material between said tracing line, then cementing said characters into the channels thus formed, then placing split corrugated dies with the corrugations downward and matching the corrugations of the upper rubber layer, then placing a V-shaped channel member between said split dies bridging the space between the cooperating corrugated surfaces of said split dies forming a continuous corrugated molding surface, then placing said die and rubber mat into a vulcanizing press and applying heat and pressure, whereby said characters are vulcanized into the rubber mat with corrugations matching said corrugations of the upper layer of said rubber mat.

LEONARD H. LEFCOURT.